United States Patent [19]

Tempco

[11] Patent Number: 4,878,639
[45] Date of Patent: Nov. 7, 1989

[54] MOUNTING BRACKET FOR A CONDUCTOR OF ELECTRICAL APPARATUS

[75] Inventor: Dale A. Tempco, Jefferson City, Mo.

[73] Assignee: Westinghouse Electric Corp., Pittsburgh, Pa.

[21] Appl. No.: 129,219

[22] Filed: Nov. 27, 1987

[51] Int. Cl.⁴ .............................................. F16L 3/08
[52] U.S. Cl. .................................. 248/73; 248/225.1; 248/300; 403/407.1
[58] Field of Search .................... 248/73, 222.4, 224.1, 248/224.2, 231.3, 316.2, 316.3, 300, 225.1, 223.1; 403/406.1, 407.1; 174/158 R, 163 R

[56] References Cited

U.S. PATENT DOCUMENTS

| | | |
|---|---|---|
| Re. 31,704 | 10/1984 | Hester . |
| 1,432,349 | 10/1922 | McFarland ...................... 403/407.1 |
| 2,377,488 | 6/1945 | Fugazzi ............................ 248/316.3 |
| 3,238,484 | 3/1966 | Dacey . |
| 3,560,630 | 2/1971 | Heather .................................. 174/51 |
| 3,596,942 | 8/1971 | Zoebelein ........................ 403/407.1 |
| 3,917,202 | 11/1975 | Reinwall Jr. et al. ....... 248/222.4 X |
| 4,127,353 | 11/1978 | Busse ................................. 403/407.1 |
| 4,141,108 | 2/1979 | Busse ................................... 248/73 X |
| 4,317,416 | 3/1982 | Baum et al. ................. 403/407.1 X |
| 4,347,490 | 8/1982 | Peterson . |
| 4,470,716 | 9/1984 | Welch .......................... 403/407.1 X |
| 4,473,316 | 9/1984 | Welch .......................... 248/222.4 X |
| 4,530,618 | 7/1985 | Stoll ............................. 403/407.1 X |

Primary Examiner—Alvin C. Chin-Shue
Assistant Examiner—David L. Talbott
Attorney, Agent, or Firm—M. J. Moran

[57] ABSTRACT

A mounting bracket for a conductor plug assembly for electrical apparatus which assembly includes a conductor plug, a plug support base, and an assembly bolt having a shaft and bolt head, the bracket being characterized by a channel shaped member including a sheetmetal plate having a slot extending from one end of the plate and dividing the plate into a pair of planar portions each of which includes an inclined runner along one of the opposite sides of the slot, each runner being similarly offset from the plane of the plate and tapered from said one end, the opposite ends of the runners being integral with the plate portions and being elongated, elastically deflectable members whereby the plug assembly is releasably, slidably mounted on the bracket by moving the bolt shaft along the slot from said open end with the bolt head sliding along the adjacent runners so as to slide the base into tight-fitting engagement with the spaced plate portions.

2 Claims, 3 Drawing Sheets

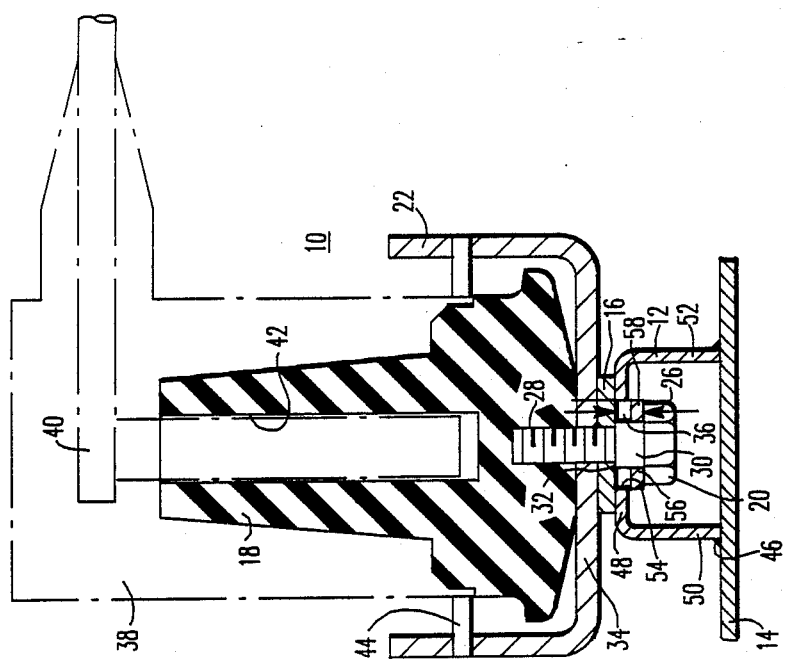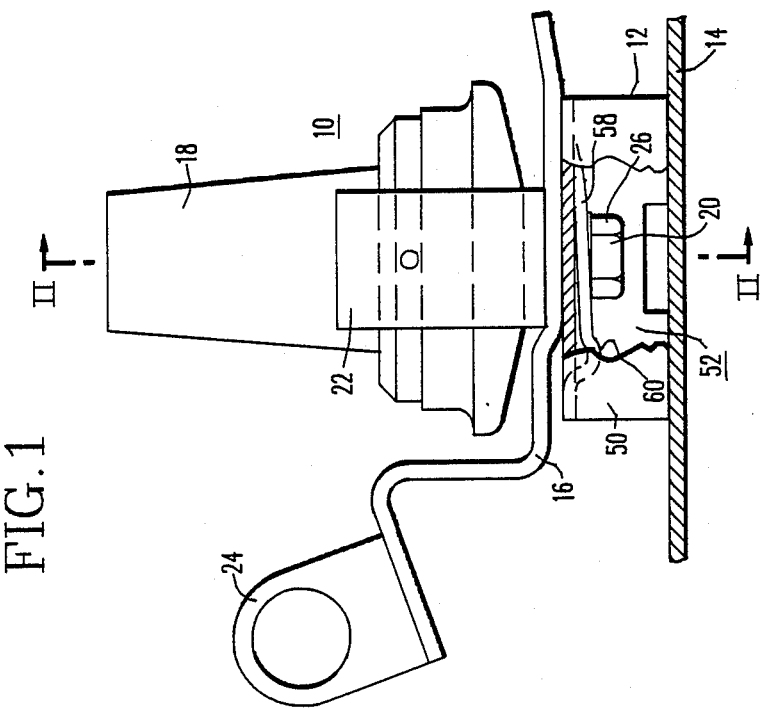

MOUNTING BRACKET FOR A CONDUCTOR OF ELECTRICAL APPARATUS

BACKGROUND OF THE INVENTION

1. Field of the Invention

This invention relates to terminal assemblies for electrical components and, more particularly, to a mounting bracket for terminal cables.

2. Description of the Prior Art

Electrical components, such as transformers, are mounted within conductive housings which include at least one terminal assembly for connecting the component into a desired circuit. For that purpose electrical cables are generally detachably connected and must be removed temporarily during maintenance of the apparatus such as a distribution transformer. Heretofore, existing cable assemblies, such as stand-off plugs or grounding plugs, have been mounted on support brackets on the housing surface adjacent to the terminal assembly. One disadvantage of the support bracket has been its unsatisfactory design and manufacturing cost.

SUMMARY OF THE INVENTION

In accordance with this invention a mounting bracket is provided for use with electrical apparatus having a terminal bushing to which an electrical cable is detachably connected and having a plug assembly including a base and an insulating plug in which the cable is inserted when removed from the bushing during maintenance. The plug is supported on the base by a bolt having a shaft and a bolt head spaced from the base. The support bracket is mounted on the apparatus for temporary mounting of the bracket and the bracket includes a plate of sheet material and has a slot extending from one end of the plate for dividing the plate into a pair of spaced planar portions each portion including an inclined runner along one of the opposite sides of the slot. Each runner is similarly offset from the plane of the plate and is tapered from said one end. The bracket plate is a channel-shaped member having a flange along opposite edges of the plate which flanges are fixedly mounted on the surface of the apparatus. Opposite ends of the runners are integral with the plate portions and are elongated and elastically deflectable, whereby the plug assembly is releasably, slidably mounted on the bracket by moving the bolt shaft along the slot from said open end with the bolt head sliding along the adjacent inclined runners so as to slide the base into tight-fitting engagement with the spaced plate portions. The inclined runners also comprise a portion of greater inclination than the runner portions nearer the open end of the slot so as to prevent loosening of the plug assembly due to tolerance variations of assembly parts.

BRIEF DESCRIPTION OF THE DRAWINGS

FIG. 1 is an elevational view of a plug mounted on the support bracket;

FIG. 2 is a vertical sectional view taken on the line II—II of FIG. 1 and showing an elbow connector mounted in place;

DESCRIPTION OF THE PREFERRED EMBODIMENTS

Figure 3:
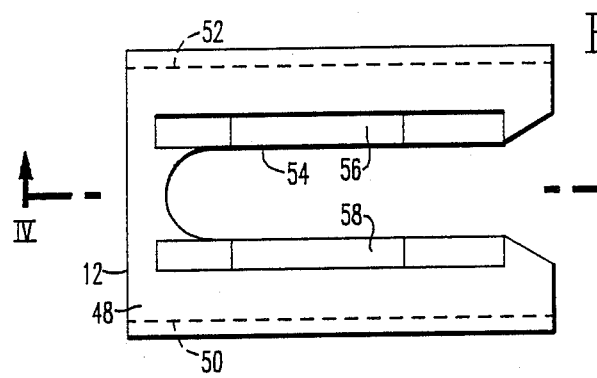
FIG. 3 is a plan view of the support bracket.

In FIGS. 1 and 2 a plug assembly is generally indicated at 10 and is detachably mounted on a support bracket 12 which in turn is fixedly mounted on a housing or tank 14 of electrical equipment, such as a distribution transformer. The plug assembly 10 comprises a base 16, an insulating plug 18, a bolt 20, and a brace 22.

The base 16 is an elongated formed metal member which serves as a support for the brace 22 and the insulating plug 18 in conjunction with the bolt 20. In addition the base 16 includes an apertured tab 24 to facilitate handling of the plug assembly 10.

The bolt 20 includes a head 26, a threaded shaft 28, and an enlarged shaft portion 30 which forms a shoulder 32 around the shaft. Manifestly, the bolt 20 holds the plug assembly 10 together with the lower end of the insulating plug 18 seated tightly against a web 34 of the brace 22 which in turn is secured against the base 16. With the shoulder 32 against the base 16, a space 36 is disposed between the brace 16 and the bolt head 26.

The purpose of the plug assembly 10 is to provide a mounting means or "parking stand" for a connector 38, such as an elbow connector, during maintenance of the transformer. The connector 38, which is normally connected to a terminal bushing (not shown) in the transformer tank 14, is detachably mounted on the insulating plug 18 with a conductor 40, extending through the insulating portion of the connector 38 and seated in a bore 42 of the plug 18. Similar retainers 44 extend from opposite sides of the brace 22 to reinforce the position of the connector 38 in place.

In accordance with this invention the plug assembly 10 is mounted on the support bracket or parking stand 12 (FIGS. 1 and 2). The bracket 12 is fixedly mounted on the tank 14 in a suitable manner, such as welds 46. The plug assembly 10 is detachably mounted on the support bracket 12 from which the plug assembly is dismounted after maintenance of the transformer is completed and the connector 38 is removed from the plug 18 and returned to its normal position in connection with the terminal bushing as set forth above. Thereafter, the plug assembly 10 is removed from the support bracket 12 by operating personnel.

Figure 4:
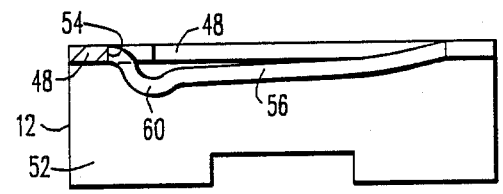
FIG. 4 is a sectional view taken on the line IV—IV of FIG. 3.
Figure 5:
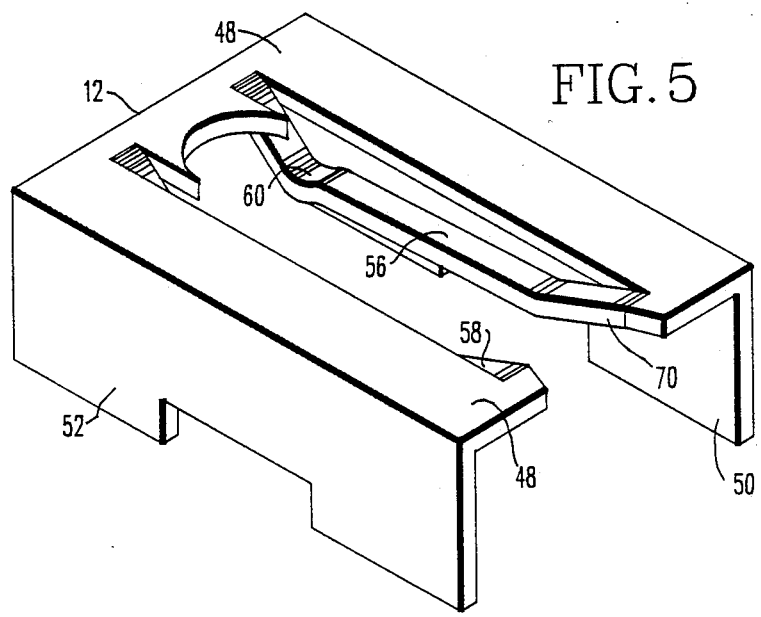
FIG. 5 is an isometric view of the support bracket.

The support bracket 12 has a preferred configuration as shown in FIGS. 3, 4, and 5 and is fabricated from stock, such as sheet metal. The support bracket 12 includes a top plate or web 48 having oppositely disposed flanges 50, 52 which are secured to the tank wall 14 by the welds 46. The plate 48 includes a longitudinal slot 54 extending from the right end of the plate. In addition, a pair of offset runners 56, 58 extend along the slot and are integral portions of the plate 48 at opposite ends thereof. As shown more particularly in FIG. 4 runner 56 is inclined or tapered downwardly from the surface of the plate 48 at an angle and also includes a downwardly bowed portion 60 adjacent the upturned left end portion of the runner. The runner 58 is similarly configured for the purpose set forth hereinbelow.

Figure 6:
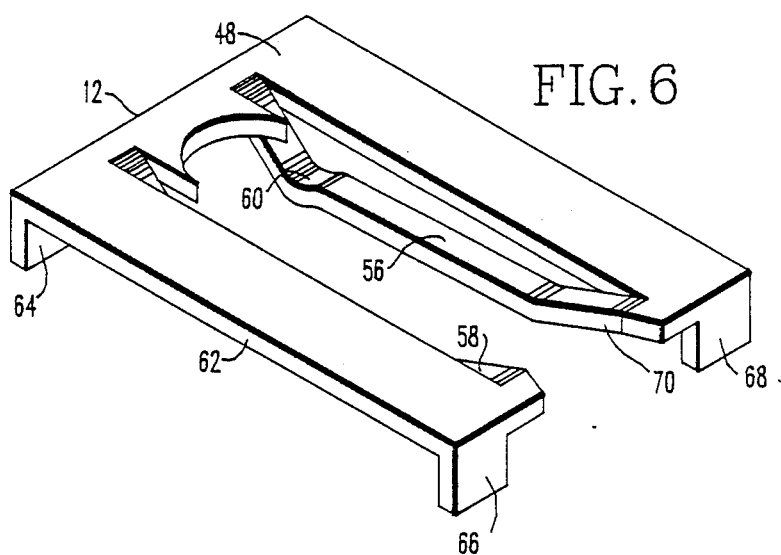
FIG. 6 is an isometric view of a support bracket of another embodiment.

Another embodiment of the bracket is shown at 62 (FIG. 6) in which similar numerals refer to similar parts as for the bracket 12. The bracket 62 differs in that it includes downturned end flanges 64, 66, 68 instead of the flanges edge 50, 52. Otherwise, the brackets 12, 62 function in a similar manner.

As shown in FIGS. 1 and 2 the plug assembly 10 is mounted on the bracket 12 by aligning the shaft 28 of the bolt 20 with the open end 70 of the longitudinal slot 54 and moving the assembly 10 to the left as viewed in FIG. 1. As the shaft 28 of the bolt moves along the slot 54, the lower surface of the base 16 rides upon the top plate 48 so that the inclined runners 56, 58, disposed in the spaces 36 (FIG. 2) bear against the bolt head 26 until the plug assembly 10 is in a tight-fitting engagement with the bracket 12. As the plug assembly 10 is moved to the tight-fitting position (FIG. 1), the runners 56, 58 deflect elastically and apply increased pressure on the assembly.

The downwardly bowed portions 60 of the runners apply particularly increased pressure upon the mounted plug assembly 10 if necessary where there are variations in the tolerances of the several parts of the assembly.

Detachment of the plug assembly 10 from the bracket is accomplished simply by moving the plug assembly 10 to the right, as viewed in FIG. 1, until the bolt moves out of the slot 54.

Figure 7:
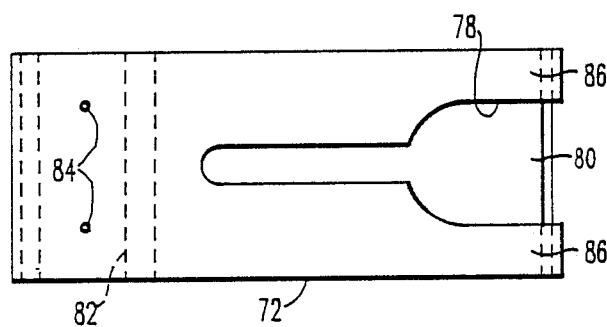
FIGS. 7 and 8 are views of a support bracket of prior art construction.
Figure 8:
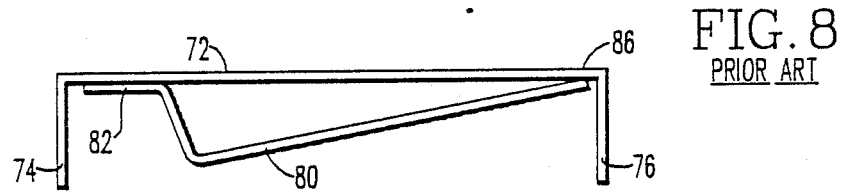

In FIGS. 7 and 8 a support bracket 72 of prior art construction is shown. The brackets 72 is a channel shaped member having flanges 74, 76 and includes a slot 78. The bracket 72 includes a runner 80 (FIG. 8), which functions similar to the runners 56, 58. The primary difference between the support bracket 72 of the prior art and the support bracket 12 is that the runner 80 include a flange 82 which is secured to the top plate of the bracket 72 in a suitable manner, such as by spot welds 84. The front ends of the runner 80 are likewise secured to the surface of the brackets 72 by similar spot welds 86. Accordingly, the support brackets 72 of prior art construction is not an integral and unified member as is the support bracket 12.

In conclusion, the mounting bracket of this invention is an improvement over the prior art bracket primarily in that it is of integral construction and therefore a less costly device. Moreover, the improved bracket of this application has grater stability because the runners are tapered at a smaller angle than the prior art bracket so as to pull the base of the plug to the face of the bracket whereby greater contact surface is provided.

What is claimed is:

1. A mounting bracket for use in an electrical apparatus having a terminal bushing to which an electrical cable is detachably connected and having a plug assembly including a base and an insulating plug in which the cable is inserted when removed from the bushing during maintenance, the plug being supported on the base by a bolt having a shaft and a bolt head spaced from the base, a bracket on the apparatus for detachably mounting the plug assembly, the bracket including a plate of sheet material and having a slot extending from one end and dividing the plate into a pair of spaced planar portions, each portion including an inclined runner along each of the opposite sides of the slot, each runner being similarly offset from the plane of the plate and tapered from said one end, whereby the plug assembly is releasably, slidably mounted on the bracket by moving the bolt shaft along the slot from said open end with the bolt head sliding along the adjacent inclined runner so as to slide the base into tight-fitting engagement with the spaced plate portions, and the inclined runner comprising a portion of greater inclination than the runner portion nearer said open end of the slot so as to prevent loosening of the plug assembly due to tolerance variations of assembly parts.

2. A mounting bracket for reliably retaining and supporting a plug assembly including a bushing, a base, and a bolt securing said bushing to said base, said bracket comprising:

a plate having an elongated, open ended slot therein;

a pair of runners formed from said plate one each extending for substantially the length of said slot and constituting the edges thereof, each of said runners sloping downwardly and away from said plate in a direction away from the open end, of said slot for a portion of their length whereby said bolt may be releasably retained by said runners in said slot, and the runners comprising a portion of greater slope than the runner portion nearer said pen end of the slot so as to prevent loosening of the bolt due to tolerance variations of assembly parts.

* * * * *